(12) United States Patent  (10) Patent No.: US 7,158,165 B2
Kato                      (45) Date of Patent:     Jan. 2, 2007

(54) LASER BEAM SCANNER

(75) Inventor: Ryota Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 844 days.

(21) Appl. No.: 09/927,520

(22) Filed: Aug. 13, 2001

(65) Prior Publication Data

US 2002/0018250 A1    Feb. 14, 2002

Related U.S. Application Data

(63) Continuation-in-part of application No. 09/758,144, filed on Jan. 12, 2001, now Pat. No. 6,888,559.

(30) Foreign Application Priority Data

Jan. 21, 2000  (JP)  ............................... 2000-12970
Aug. 16, 2000  (JP)  ............................... 2000-246674

(51) Int. Cl.
    *B41J 27/00*     (2006.01)
(52) U.S. Cl. ...................... 347/244; 347/258

(58) Field of Classification Search ........ 347/234–235, 347/241–244, 250, 256–261, 248; 359/204, 359/207, 217; 250/234
See application file for complete search history.

(56) References Cited

U.S. PATENT DOCUMENTS

| 4,847,492 | A  | * | 7/1989  | Houki ........................ 359/217 |
| 5,621,562 | A  | * | 4/1997  | Hama ......................... 359/207 |
| 5,663,558 | A  | * | 9/1997  | Sakai ......................... 250/234 |
| 6,239,828 | B1 | * | 5/2001  | Ito et al. ..................... 347/241 |
| 6,317,244 | B1 | * | 11/2001 | Ishibe ........................ 359/204 |
| 6,476,955 | B1 | * | 11/2002 | Yoshida ...................... 359/204 |
| 6,888,559 | B1 |   | 5/2005  | Ito et al. ..................... 347/250 |

OTHER PUBLICATIONS

U.S. Appl. No. 09/758,144, filed Jan. 12, 2001, Ito et al.

* cited by examiner

*Primary Examiner*—Hai Pham
(74) *Attorney, Agent, or Firm*—Oliff & Berridge, PLC (57) ABSTRACT

In a laser beam scanner according to the invention, L2/L1>L4/L3 is satisfied, where L2/L1 is the lateral magnification in the sub-scanning direction in an optical path from a polygon mirror to a photosensitive drum, and L4/L3 is the lateral magnification in the sub-scanning direction in an optical path from the polygon mirror to a beam detector. Accordingly, the light-receiving width of the beam detector can be reduced as compared with a conventional laser beam scanner where L2/L1=L4/L3.

7 Claims, 7 Drawing Sheets

RELATED ART

LASER BEAM SCANNER

BACKGROUND OF THE INVENTION

1. Field of Invention

The invention relates to a laser beam scanner that scans a laser beam across a photosensitive member to form an image thereon.

2. Description of Related Art

Figure 7:
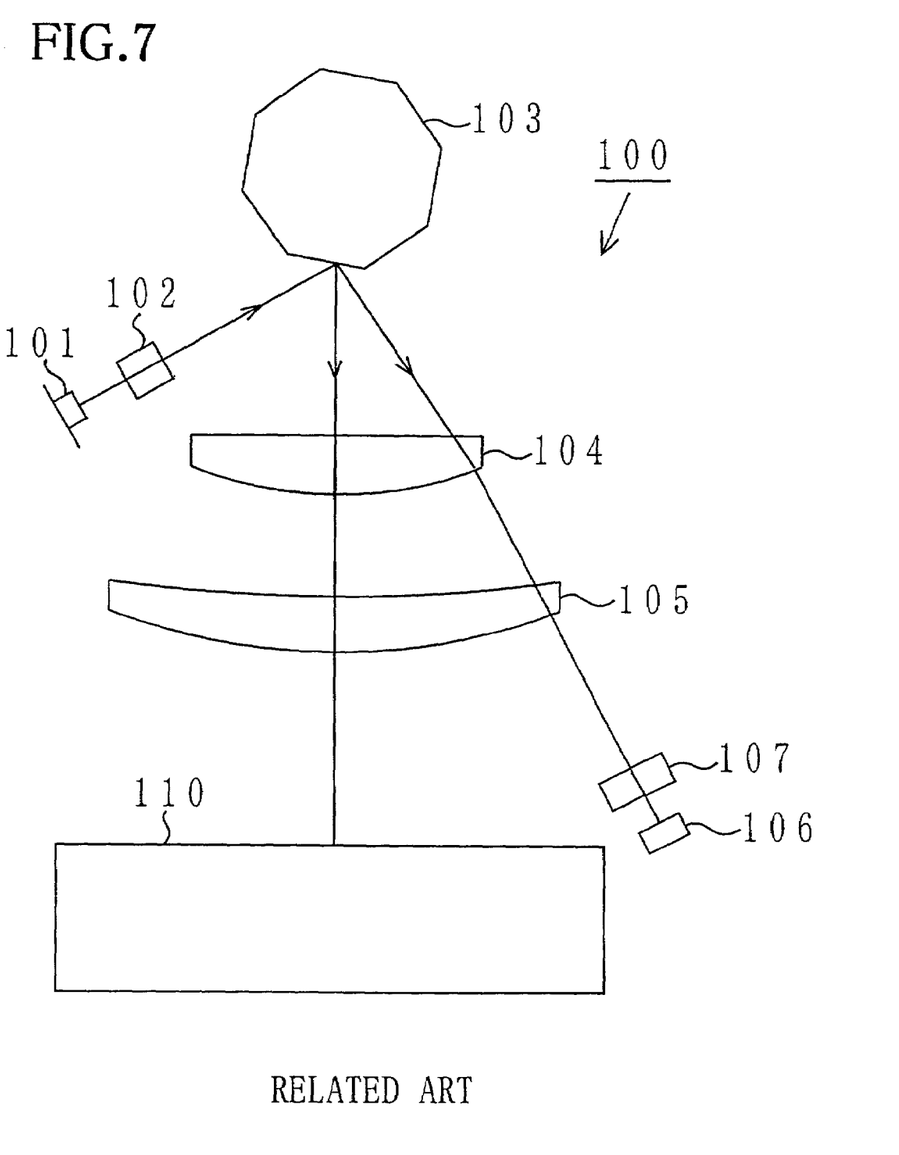
FIG. 7 illustrates the basic structure of a conventional laser beam scanner.

Such a laser beam scanner 100, as shown in FIG. 7, has conventionally been known. FIG. 7 illustrates the basic structure of the conventional laser beam scanner 100.

The laser beam scanner 100 includes a laser light source 101 into which a semiconductor laser element and a collimator lens are integrated, a cylindrical lens 102 that converges the laser beam emitted from the laser light source 101, a polygon mirror 103 that deflects the laser beam having passed through the cylindrical lens 102, a first fθ lens 104 and a second fθ lens 105 that converge the laser beam deflected by the polygon mirror 103 on a photosensitive drum 110, a beam detector 106, as a light-sensing element, that detects the laser beam having passed through the second fθ lens 105, and a focusing lens 107 that converges the laser beam having passed through the second fθ lens 105 on the beam detector.

The first fθ lens 104 has converging power mainly in the main scanning direction, while the second fθ lens 105 has converging power mainly in the sub-scanning direction. At this time, it is to be understood that the main scanning direction is the direction in which the laser beam is scanned by the rotation of the polygon mirror 103, while the sub-scanning direction is the direction perpendicular to the main scanning direction. The beam detector 106, disposed at a laser beam converging point outside the effective scanning range on the photosensitive drum 110, detects the laser beam emitted from the laser light source 101 to provide the scan start timing.

In another known laser beam scanner, a mirror is provided to reflect the laser beam having passed through the second fθ lens 105 and the reflected laser beam is converged by the focusing lens 107 on the beam detector 106.

Also known is a multiple laser beam scanner that uses a plurality of laser beams in order to increase the exposure speed. In such a multiple laser beam scanner, a beam detector must receive all of the multiple laser beams, which are spaced from each other in the sub-scanning direction, in order to provide the scan start timing of each laser beam. In this case, the beam detector must have a light-receiving surface wide enough in the sub-scanning direction to receive all of the multiple laser beams.

However, as the light-receiving surface is increased, capacitance of the sensing element increases and its response deteriorates.

Sensitivity of the light-receiving surface varies from position to position depending on manufacturing conditions. When the positions of laser beams incident upon the light-receiving surface are fairly separated from each other, a lag of the scan start timing between the laser beams is caused due to the above-mentioned variations in sensitivity.

Another problem is that the large light-receiving surface makes the beam detector and its mounting space large. As a result, it is difficult to downsize products incorporating such a multiple laser beam scanner.

SUMMARY OF THE INVENTION

The invention addresses the forgoing problems and provides a laser beam scanner capable of reducing the width of a beam detector in the sub-scanning direction required for receiving a plurality of laser beams emitted from a plurality of laser light sources.

According to one aspect of the invention, a laser beam scanner for scanning a plurality of laser beams in a main scanning direction includes a plurality of laser light sources, each of which emits a laser beam; a deflector that deflects the laser beam emitted from each of the plurality of laser light sources; a first converging unit that converges, in the main scanning direction and in a sub-scanning direction perpendicular to the main scanning direction, the laser beam deflected by the deflector; a photosensitive member across which the laser beam converged at least in the sub-scanning direction by the first converging unit is scanned; a detector that receives and detects the laser beam converged at least in the main scanning direction by the first converging unit to provide scan start timing of the laser beam, a second converging unit that converges the laser beam emitted from each of the plurality of laser light sources on the deflector; and a third converging unit that converges, in the sub-scanning direction, the laser beam converged at least in the main scanning direction by the first converging unit, on the detector. A lateral magnification in the sub-scanning direction in an optical path from the deflector to the detector is less than the lateral magnification in the sub-scanning direction in an optical path from the deflector to the photosensitive member.

Each of the laser beams emitted from a plurality of laser light sources is deflected by the deflector. Then the deflected laser beam, which is converged at least in the sub-scanning direction by the first converging unit, on the photosensitive member. Meanwhile, the detector detects the laser beam deflected by the deflector and converged at least in the main scanning direction by the first converging unit and converged by the third converging unit in order to provide the scan start timing of the laser beam.

Because the lateral magnifications are set as described above in the laser beam scanner, the positions of the laser beams incident on the detector can be made closer to each other, in the sub-scanning direction, as compared with the case where the lateral magnifications are set otherwise.

Accordingly, a light-receiving surface of the detector can be made smaller. As a result, the capacitance of the light-receiving surface can be reduced and its response can be improved. In addition, positional variations in sensitivity of the light-receiving surface can be minimized. Thus, a lag of the scan start timing of each laser beam can be reduced.

Further, as the light-receiving surface becomes smaller, the beam detector becomes smaller, and the mounting space of the beam detector can be reduced. Thus, products incorporating a laser beam scanner structured as described above can be reduced in size.

Additionally, the second converging unit and the third converging unit may be formed by the same unidirectional converging lenses. In this case, the number of common parts increases, and thus the manufacturing cost of the laser beam scanner can be reduced.

BRIEF DESCRIPTION OF THE DRAWINGS

Preferred embodiments of the invention will be described with reference to the following figures wherein.

DETAILED DESCRIPTION OF PREFERRED EMBODIMENTS

A first embodiment of a laser beam scanner according to the invention will be described in conjunction with the attached drawings. In the following exemplary embodiments, a laser beam scanner implementing the invention is used in a laser beam printer.

Figure 1:
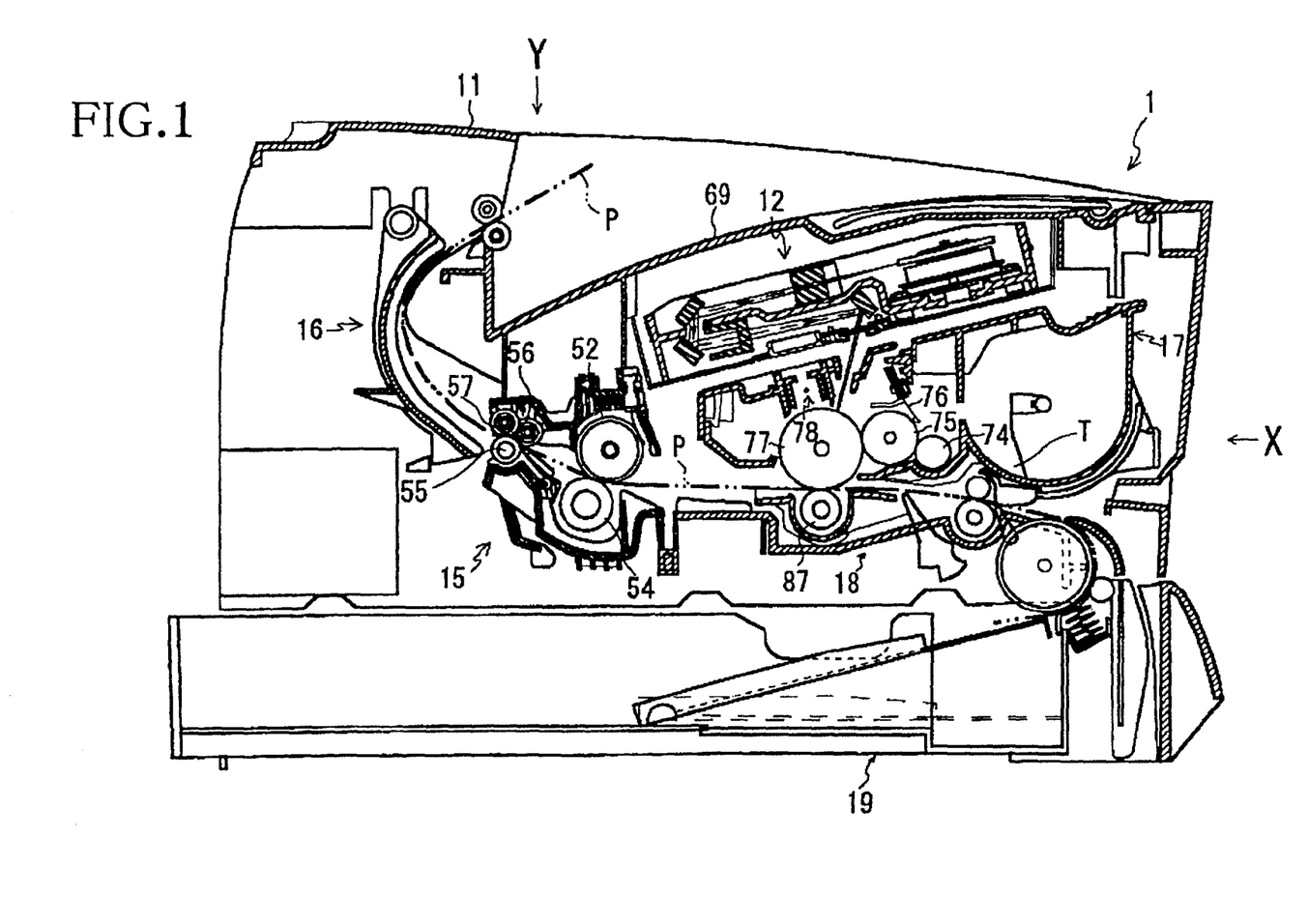
FIG. 1 is a side cross-sectional view of a laser printer viewed from a direction perpendicular to a sheet feed direction.

Referring first to FIG. 1, the basic structure of a laser printer will be described. FIG. 1 is a side cross-sectional view of the laser printer 1 viewed from a direction perpendicular to a sheet feed direction. In FIG. 1, it is understood that a side shown by the arrow X is a front side, a side shown by the arrow Y is a top side, and a side facing the reader is a left side (when viewed from the front in the direction of arrow X).

The overall shape of the laser printer 1, defined by the main frame 11, is generally rectangular. At the bottom of the main frame 11, a sheet feeder 19 is provided so as to store and feed sheets P. A sheet P is fed from the sheet feeder 19 to a transport unit 18 via a front portion of the laser printer 1. Disposed above the transport unit 18 is a developing unit 17 integrated into a process unit. Disposed above the developing unit 17 is a laser beam scanner 12 implementing the invention. A photosensitive drum 77 in the developing unit 17 is uniformly electrically charged by a charger 78 provided above the photosensitive drum 77. The laser beam scanner 12 scans one or more laser beams, modulated based on image signals, across the photosensitive drum 77 to form a latent image.

Meanwhile, toner T contained in the developing unit 17 is supplied by a supply roller 74 to a developing roller 75. Toner T deposited around the developing roller 75 develops the latent image formed on the photosensitive drum 77 into a visible toner image. The toner T deposited around the developing roller 75 is regulated to an appropriate thickness by a layer thickness-regulating blade 76. The sheet P fed to the transport unit 18 is pinched by the photosensitive drum 77 and a transfer roller 87, and thereby the toner image on the photosensitive drum 77 is transferred to the sheet P. Then the sheet P is transported to a fixing unit 15 at the rear. After that, the sheet P is pinched by a heat roller 52 and a pressure roller 54. The toner on the sheet P is melted and permeates into the fibers of the sheet P, and the sheet P is transported toward the rear of the printer. Then the sheet P is discharged by a first discharge roller 55 and first and second driven rollers 56, 57 to an output tray 69 via a discharge path 16.

Figure 2:
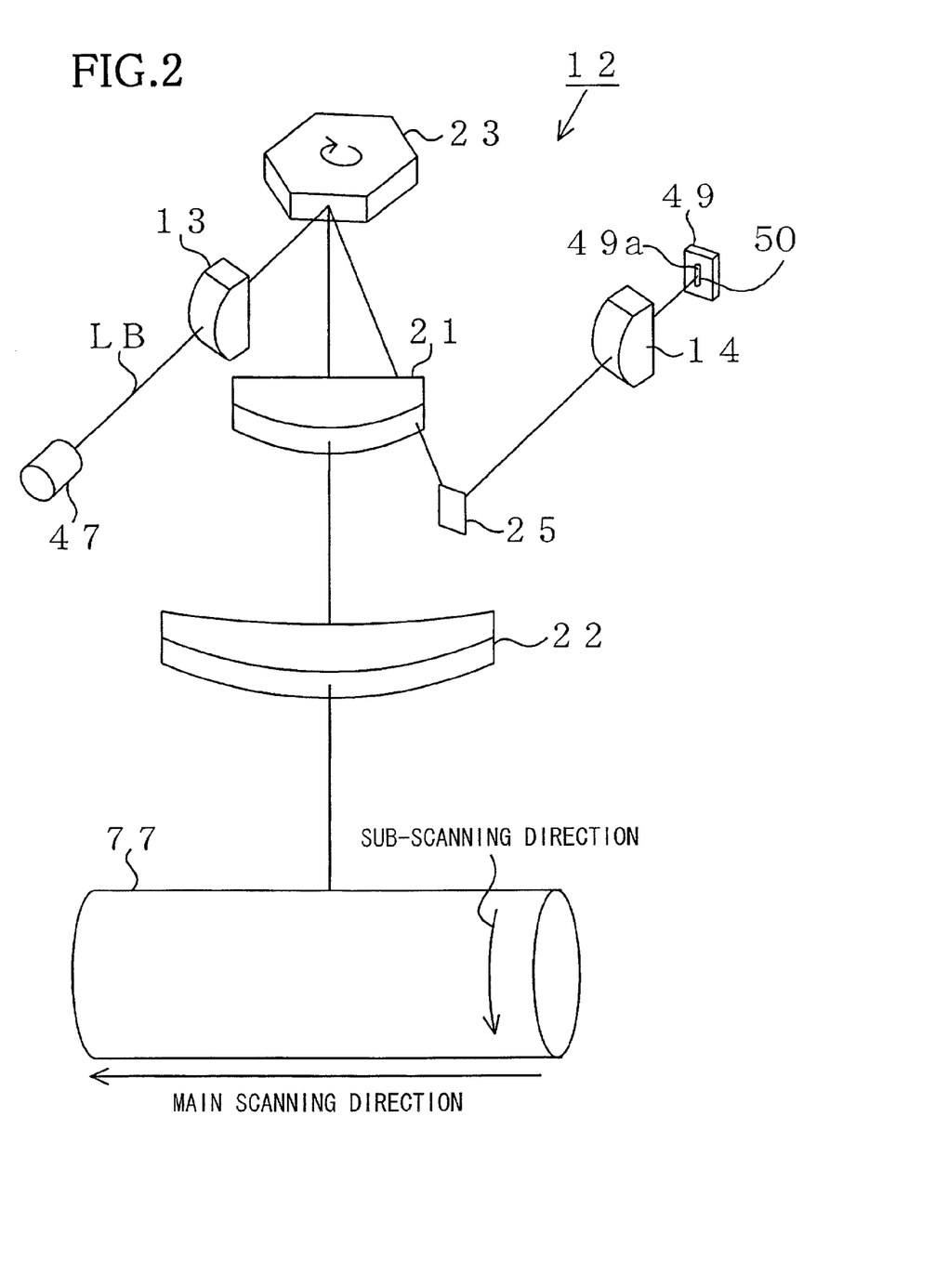
FIG. 2 illustrates the basic structure of a laser beam scanner according to a first embodiment of the invention.

Referring now to FIG. 2, the basic structure of the laser beam scanner 12 will be described. Although, in the actual operation, a plurality of laser beams are used, only a single laser beam is shown in FIG. 2 for simplicity.

The laser beam scanner 12 includes a laser light source 47 into which a laser diode and a collimator lens are integrated, a first cylindrical lens 13 that is a unidirectional converging lens, a polygon mirror 23, a first fθ lens 21, a second fθ lens 22, a mirror 25, a second cylindrical lens 14 that is a unidirectional converging lens, a slit 50, and a beam detector 49.

A laser beam LB emitted from the laser light source 47 is converged in the sub-scanning direction by the first cylindrical lens 13, which has converging power in the sub-scanning direction, and strikes the polygon mirror 23. At this time, it is to be understood that the sub-scanning direction is the direction perpendicular to the direction in which the laser beam LB is scanned by the rotation of the polygon mirror 23 (namely, the main scanning direction). The polygon mirror 23, which is rotated by a scanner motor (not shown) at high speed in the direction of the arrow, deflects the laser beam LB at a constant angular velocity. The deflected laser beam LB is mainly converged in the main scanning direction by the first fθ lens 21 having converging power mainly in the main scanning direction. In addition, the deflected laser beam LB is mainly converged in the sub-scanning direction by the second fθ lens 22, which has converging power mainly in the sub-scanning direction. Consequently, the photosensitive drum 77 is irradiated with the laser beam traveling in the main scanning direction and a latent image is formed on the photosensitive drum 77.

The laser beam LB is reflected by the mirror 25 immediately before being scanned across the photosensitive drum 77. The reflected laser beam LB does not pass through the second fθ lens 22 having converging power in the sub-scanning direction. Instead, the reflected laser beam LB passes through the second cylindrical lens 14 having converging power in the sub-scanning direction and is converged mainly in the sub-scanning direction. Then the converged laser beam LB passes through the slit 50 provided on a light-receiving surface 49a of the beam detector 50, and is received by the beam detector 49.

The photosensitive drum 77 is rotated by a stepping motor (not shown). As the photosensitive drum 77 is rotated, the laser beam LB is scanned relative to the sub-scanning direction across a photosensitive member formed on the surface of the photosensitive drum 77. By being sequentially irradiated with the light beam LB, the photosensitive member is entirely exposed to the laser beam LB and, as a result, a latent image is formed thereon. The structure of a laser beam scanner similar to the above-described structure is disclosed in U.S. patent application Ser. No. 09/758,144 filed on Jan. 12, 2001, the disclosure of which is incorporated herein by reference.

Referring now to FIGS. 3A, 3B, 4A and 4B, the lateral magnification in the sub-scanning direction in an optical path from the polygon mirror 23 to the photosensitive drum 77 (hereinafter referred to as a "writing optical path") and the lateral magnification in the sub-scanning direction in an optical path from the polygon mirror 23 to the beam detector 49 (hereinafter referred as a "BD optical path") will be described.

Figure 3A:
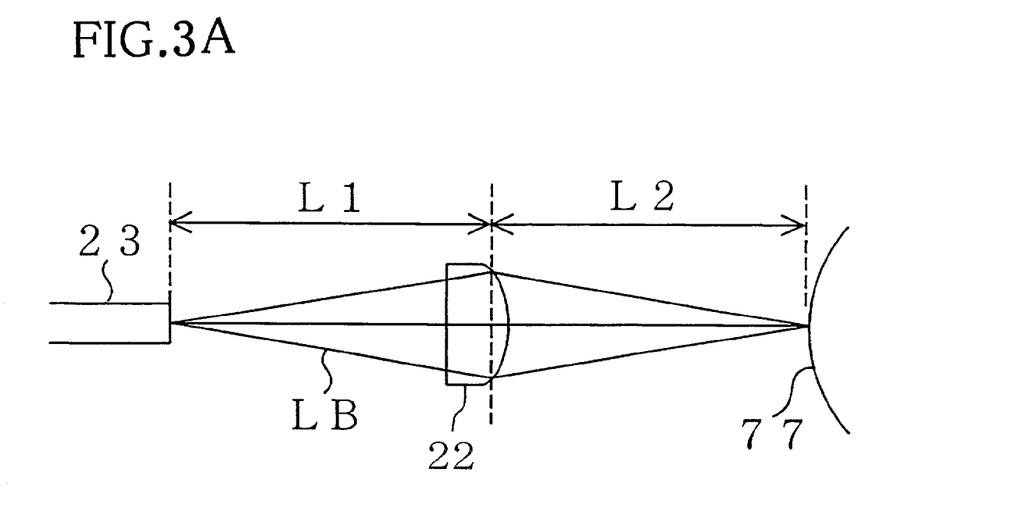
FIG. 3A is a schematic diagram of a writing optical path sectioned in the sub-scanning direction, according to the first embodiment.
Figure 3B:
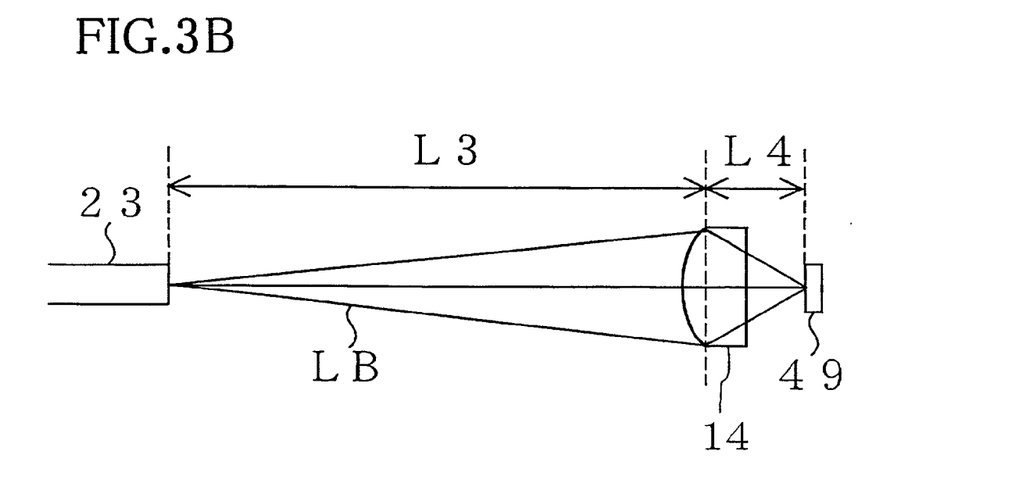
FIG. 3B is a schematic diagram of a beam detector optical path sectioned in the sub-scanning direction, according to the first embodiment.
Figure 4A:
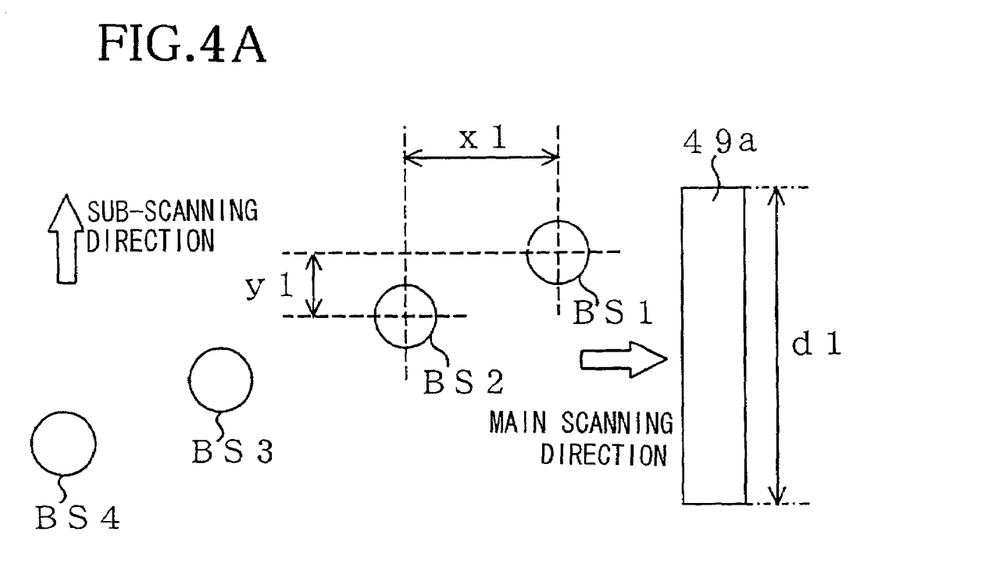
FIG. 4A illustrates the relationship between beam spots in the writing optical path and a light-receiving surface of a beam detector, according to the first embodiment.
Figure 4B:
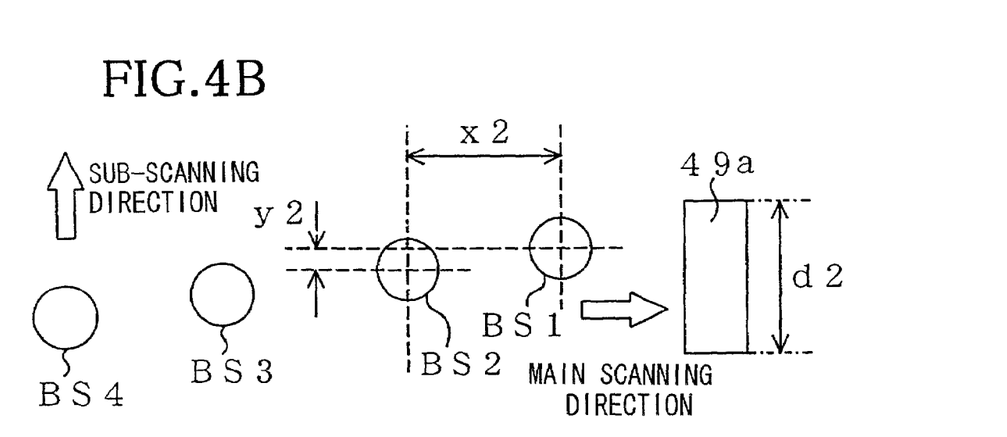
FIG. 4B illustrates the relationship between beam spots in the beam detector optical path and the light-receiving surface of the beam detector, according to the first embodiment.

FIG. 3A is a schematic diagram showing the writing optical path sectioned along the sub-scanning direction. FIG. 3B is a schematic diagram showing the BD optical path sectioned along the sub-scanning direction. FIG. 4A illustrates the relationship between beam spots and the light-receiving surface 49a of the beam detector 49 if in the writing optical path. FIG. 4B illustrates the relationship between beam spots and the light-receiving surface 49a of the beam detector 49 in the BD optical path.

A multiple laser beam scanner using four laser beams will be described here by way of example. As shown in FIG. 3A, the lateral magnification in the sub-scanning direction in the writing optical path is L2/L1 and, as shown in FIG. 3B, the lateral magnification in the sub-scanning direction in the BD optical path is L4/L3.

In addition, L2/L1 and L4/L3 have the following relationship:

$$L2/L1 > L4/L3 \qquad \text{expression 1.}$$

In other words, the second cylindrical lens 14 (FIG. 2), placed in the BD optical path, is designed to have the curvature satisfying expression 1.

Turning now to FIG. 4A, the relationship between the beam spots and the light-receiving surface 49a of the beam detector 49 if in the writing optical path will be described. As shown in FIG. 4A, when four beam spots BS1–BS4 are incident upon the photosensitive drum 77, an adjacent two beam spots are spaced a distance x1 away from each other in the main scanning direction and a distance y1 away from each other in the sub-scanning direction.

When expression 1 is not satisfied, as in a conventional laser beam scanner, for example, when L2/L1=L4/L3, i.e., the light-receiving surface 49a of the beam detector 49 is in the writing optical path, the width d1 in the sub-scanning direction of the light-receiving surface 49a of the beam detector 49 should be greater than 3×y1 (d1>3×y1) in order to receive all of the four beam spots BS1, BS2, BS3, and BS4, in order. When the number of laser beams is n (≧2), the following expression should be satisfied:

$$d1 > (n-1)y1 \qquad \text{expression 2.}$$

Turning now to FIG. 4B, the relationship between the beam spots and the light-receiving surface 49a of the beam detector 49 in the BD optical path will be described. As shown in FIG. 4B, when four beam spots BS1–BS4 are incident upon the light-receiving surface 49a, adjacent two beam spots are spaced a distance x2 away from each other in the main scanning direction and a distance y2 away from each other in the sub-scanning direction.

In this case, the relationship between y1 and y2 is expressed as follows:

$$y1 > y2 \qquad \text{expression 3.}$$

The relationship between x1 and x2 can be arbitrarily set. However, when the second cylindrical lens 14 having converging power only in the sub-scanning direction is used, the relationship between x1 and x2 will be as follows:

$$x1 = x2 \qquad \text{expression 4.}$$

The width d2 in the sub-scanning direction of the light-receiving surface 49a of the beam detector 49 should satisfy the following expression in order to receive all of the four laser beams BS1–BS4 in the BD optical path:

$$d2 > (n-1)y2 \qquad \text{expression 5.}$$

Because y1>y2 according to expression 3, the following expression is given:

$$d2 < d1 \qquad \text{expression 6.}$$

In short, when expression 1 (L2/L1>L4/L3) is satisfied, the width in the sub-scanning direction of the light-receiving surface 49a of the beam detector 49 can be reduced by (d1−d2). The use of the laser beam scanner 12 according to the first embodiment can reduce the width in the sub-scanning direction of the light-receiving surface 49a of the beam detector 49 by (d1−d2). Accordingly, the capacitance of the beam detector 49 can be reduced and the response of the beam detector 49 can be improved.

In addition, because the positions of laser beams incident upon the light-receiving surface 49a, after being emitted from the four laser light sources, can be made as close as possible to each other, variations in sensitivity of the light-receiving surface 49a, produced due to manufacturing conditions, can be accommodated. In other words, the four laser beams can be received at portions having substantially the same sensitivity. Thus, a lag in the scan start timing is unlikely to occur between the four laser beams.

Further, the shorter the width in the sub-scanning direction of the light-receiving surface 49a, the smaller the size of the light-receiving surface 49a. Thus, the beam detector can be made smaller and its mounting space can be reduced. As a result, the laser printer 1, incorporating the above-described multiple laser beam scanner, can be reduced in size.

Referring now to FIGS. 5A through 5C and 6, a second embodiment of a laser beam scanner according to the invention will be described.

Figure 5A:
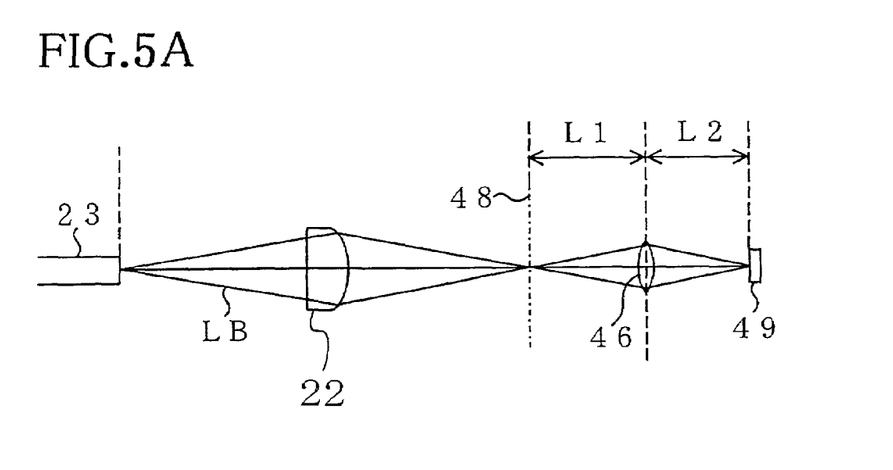
FIG. 5A is a schematic diagram of a beam detector optical path sectioned in the sub-scanning direction in a laser beam scanner according to a second embodiment of the invention.
Figure 5B:
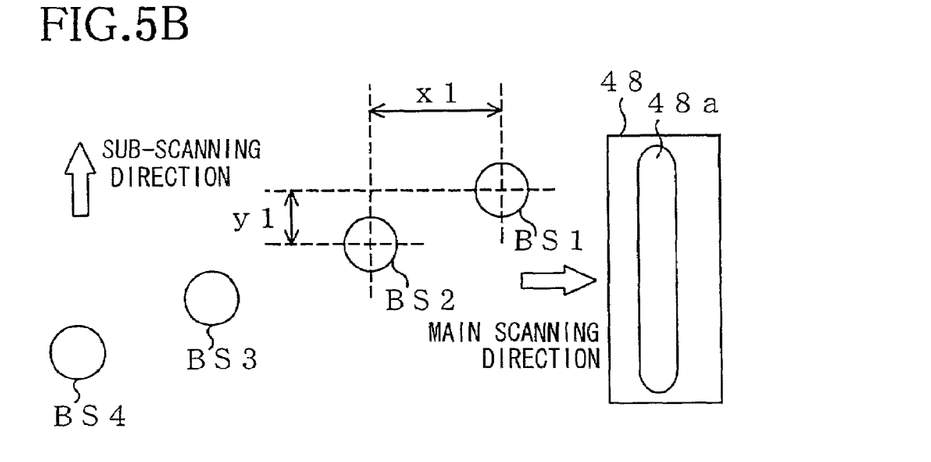
FIG. 5B illustrates the relationship between beam spots passing through a slit and a light-receiving surface of the beam detector, according to the second embodiment.
Figure 5C:
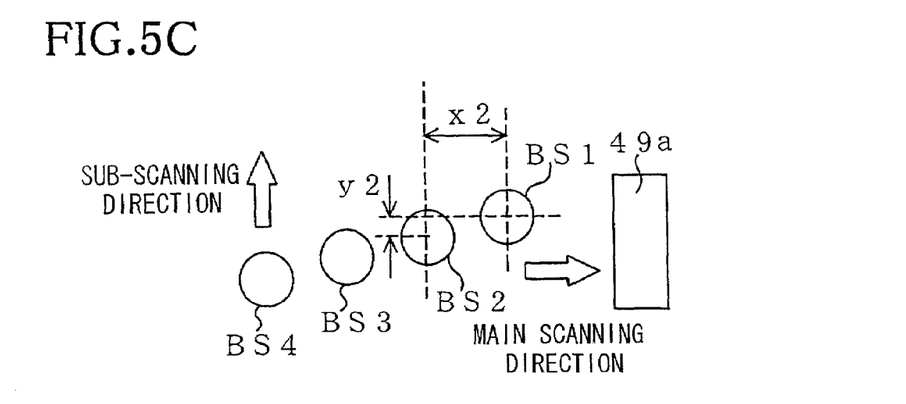
FIG. 5C illustrates the relationship between the beam spots incident upon the beam detector and the light-receiving surface of the beam detector, according to the second embodiment.
Figure 6:
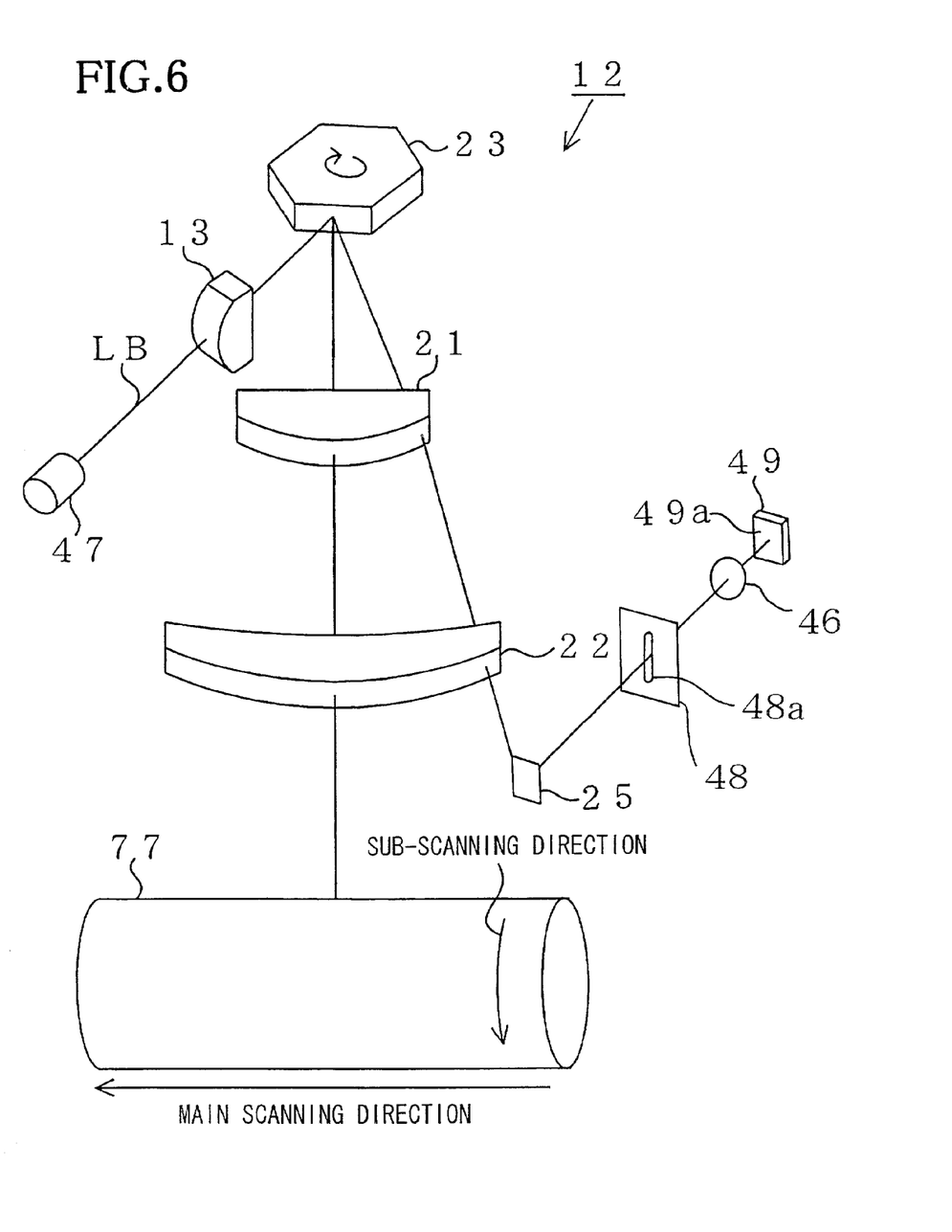
FIG. 6 illustrates the basic structure of the laser beam scanner according to the second embodiment.

FIG. 5A is a schematic diagram showing a BD optical path sectioned along the sub-scanning direction. FIG. 5B illustrates the relationship between beam spots passing through a slit and a light-receiving surface 49a of a beam detector 49. FIG. 5C illustrates the relationship between beam spots incident upon the beam detector 49 and the light-receiving surface 49a of the beam detector 49. The structure of the laser beam scanner of the second embodiment is the same as that of the first embodiment except for the BD optical path.

As shown in FIGS. 5A, 5B, 5C and 6, a member 48 formed with a slit 48a (FIG. 5B) is placed before the beam detector 49, and a converging lens 46 is placed between the member 48 and the beam detector 49. A laser beam LB reflected by a polygon mirror 23 is focused into the slit 48a in the BD optical path. Then the laser beam LB passing through the slit 48a is focused onto the light-receiving surface 49a (FIG. 5C) of the beam detector 49.

In this case, y1 is greater than y2, and the lateral magnification in the sub-scanning direction of the optical system after the slit 48a is less than 1, that is, L2/L1<1. The relationship between x1 and x2 is arbitrary. When a spherical lens is used as the converging lens 46, x1 becomes greater than x2.

In short, the width in the sub-scanning direction of the four light beam spots incident upon the light-receiving surface 49a of the beam detector 49 can be made shorter than that of the four light beam spots passing through the slit 48a. Accordingly, the same effect as in the first embodiment can be produced in this embodiment.

In addition, by adjusting the mounting position of the slit 48a in the main scanning direction, variations in scan start timing produced due to positioning errors of optical elements can be accommodated. As a result, the accuracy of scan start timing can be improved.

While the invention has been described in conjunction with specific embodiments thereof, various alternatives and modifications can be made thereto without departing from the scope of the invention.

For example, the first cylindrical lens 13 and the second cylindrical lens 14 can be the same type cylindrical lens, i.e., they are interchangeable, having the same optical characteristics. The number of common parts increases and thus the manufacturing cost for the laser beam scanner can be reduced.

Although in the above-described embodiments, the first fθ lens 21 and the second fθ lens 22 are used, a singe fθ lens that has converging power in both the main and sub-scanning directions may be used instead. Instead of the first and second cylindrical lenses 13, 14, other lenses having the property of unidirectionally converging laser beams or combinations of such lenses may be used.

A laser beam scanner according to the invention may be applicable to a printer provided in a copier or in a facsimile. Accordingly, the invention is intended to embrace all such alternatives and modifications which fall within the scope of the appended claims.

What is claimed is:

1. A laser beam scanner that scans a plurality of laser beams in a main scanning direction, comprising:
    a plurality of light sources, each light source emitting a laser beam of the plurality of laser beams;
    a first converging unit converging the emitted plurality of laser beams in a sub-scanning direction;
    a deflector that deflects the plurality of laser beams in a scanning direction;
    a second converging unit that converges the plurality of laser beams in the scanning direction and the sub-scanning direction;
    a photosensitive member onto which the plurality of laser beams are converged by the second converging unit;
    a detector that receives the deflected plurality of laser beams converged at least in the scanning direction by the second converging unit; and
    a third converging unit that converges the plurality of laser beams at least in the sub-scanning direction,
    wherein a width of the converged plurality of laser beams in the sub-scanning direction on the detector is less than a width of the plurality of laser beams in the sub-scanning direction on the photosensitive member.

2. The laser beam scanner according to claim 1, wherein the first converging unit that converges, in the sub-scanning direction, the plurality of laser beams emitted from the plurality of laser light sources onto the deflector, and the third converging unit are formed by a same type of unidirectional converging lens.

3. The laser beam scanner according to claim 1, wherein the second converging unit comprises a first lens having converging power in the scanning direction and a second lens having converging power in the sub-scanning direction, and wherein the lateral magnification in the optical path from the deflector to the photosensitive member is represented by L2/L1, where L1 is a distance between the deflector and the second lens and L2 is a distance between the second lens and the photosensitive member, and the lateral magnification in the optical path from the deflector to the detector is represented by L4/L3, where L3 is a distance between the deflector and the third converging unit and L4 is a distance between the third converging unit and the detector.

4. The laser beam scanner according to claim 3, further comprising a mirror disposed between the first lens of the second converging unit and the third converging unit so as to reflect the laser beam incident from the first lens onto the third converging unit.

5. The laser beam scanner according to claim 1, further comprising a slit member disposed on a position optically equal to a scanned position of the photosensitive member, wherein the third converging unit is between the slit member and the detector.

6. The laser beam scanner according to claim 5, wherein the lateral magnification is represented by L2/L1, where L1 is a distance from the slit member to the third converging unit and L2 is a distance from the third converging unit to the detector.

7. The laser beam scanner according to claim 5, further comprising a mirror disposed between the first converging unit and the photosensitive member so as to reflect the plurality of laser beams to the slit member.

* * * * *